(12) United States Patent
Zhao et al.

(10) Patent No.: US 7,458,862 B2
(45) Date of Patent: Dec. 2, 2008

(54) CANTED COIL SPRING POWER TERMINAL AND SEQUENCE CONNECTION SYSTEM

(75) Inventors: Weiping Zhao, Superior Township, MI (US); Stefano Spadoni, Plymouth, MI (US); Ankoor Bagchi, Troy, MI (US)

(73) Assignee: Alcoa Fujikura Ltd., Franklin, TN (US)

( * ) Notice: Subject to any disclaimer, the term of this patent is extended or adjusted under 35 U.S.C. 154(b) by 0 days.

(21) Appl. No.: 11/760,897

(22) Filed: Jun. 11, 2007

(65) Prior Publication Data

US 2007/0232154 A1    Oct. 4, 2007

Related U.S. Application Data

(62) Division of application No. 11/137,289, filed on May 25, 2005, now Pat. No. 7,229,327.

(51) Int. Cl.
*H01R 13/33* (2006.01)
(52) U.S. Cl. ...................................... 439/840
(58) Field of Classification Search ............ 439/500, 439/510, 513, 522, 627, 840, 759, 762
See application file for complete search history.

(56) References Cited

U.S. PATENT DOCUMENTS

| | | | |
|---|---|---|---|
| 1,420,437 A | | 6/1922 | Mayer |
| 1,505,531 A | | 8/1924 | Bensett |
| 1,707,252 A | | 4/1929 | Chubb |
| 1,808,368 A | * | 6/1931 | Montambault .............. 439/759 |
| 3,155,450 A | * | 11/1964 | Filson ......................... 439/852 |
| 3,210,719 A | * | 10/1965 | Graeff ......................... 439/439 |
| 3,316,522 A | * | 4/1967 | Demler, Sr. .................. 439/288 |
| 3,382,479 A | | 5/1968 | Cooney |
| 3,569,919 A | | 3/1971 | Daddona, Jr. |
| 3,728,669 A | * | 4/1973 | Churla ......................... 439/859 |
| 4,024,953 A | | 5/1977 | Nailor, III |
| 4,063,794 A | | 12/1977 | Dittmann |
| 4,347,294 A | | 8/1982 | Mejia |
| 4,394,059 A | | 7/1983 | Reynolds |
| 4,455,060 A | | 6/1984 | Koper et al. |
| 4,475,782 A | | 10/1984 | Bartolf |
| 4,521,067 A | | 6/1985 | Dufresne |
| 4,590,186 A | | 5/1986 | Takaya et al. |
| 4,950,186 A | | 8/1990 | Kaley et al. |
| 4,957,829 A | | 9/1990 | Holl |

(Continued)

*Primary Examiner*—Renee S Luebke
*Assistant Examiner*—Larisa Tsukerman
(74) *Attorney, Agent, or Firm*—Greenberg Traurig, LLP

(57) ABSTRACT

The present invention provides an electrical power system comprising a plurality of battery modules in series connection between adjacent battery modules, wherein each of the battery modules comprises a positive male terminal, a negative male terminal, and a socket corresponding to each of the positive male terminals and the negative male terminals. The connectors connecting the adjacent battery modules include a sequence tab that provides an irreversible engagement sequence of the connectors into the sockets of the adjacent battery modules. The irreversible engagement sequence positions an insulating portion of the connectors housing on each positive male terminal of the battery modules that are in series connection in order to isolate the positive male terminals from human contact. The present invention also provides a female terminal including a canted coil spring positioned within a stamped groove that may be housed within the above-described connectors.

15 Claims, 14 Drawing Sheets

U.S. PATENT DOCUMENTS

| | | | |
|---|---|---|---|
| 5,015,191 A * | 5/1991 | Grabbe et al. ............... 439/71 |
| 5,092,781 A | 3/1992 | Casciotti et al. |
| 5,108,320 A * | 4/1992 | Kimber .................. 439/883 |
| 5,310,359 A | 5/1994 | Chadbourne et al. |
| 5,411,348 A * | 5/1995 | Balsells ................. 403/326 |
| 5,462,453 A | 10/1995 | Muller |
| 5,545,842 A | 8/1996 | Balsells |
| 5,576,516 A * | 11/1996 | Kameyama et al. ...... 174/138 F |
| 5,584,723 A | 12/1996 | Sutliff et al. |
| 5,727,821 A * | 3/1998 | Miller ................... 285/318 |
| 5,738,552 A | 4/1998 | Halbach et al. |
| 5,809,136 A | 9/1998 | Turner |
| 5,885,116 A | 3/1999 | Byfield, Jr. |
| 5,886,501 A * | 3/1999 | Marks et al. ............ 320/112 |
| 5,931,690 A | 8/1999 | Sai et al. |
| 5,948,983 A | 9/1999 | Gogol et al. |
| 6,097,173 A | 8/2000 | Bryant, Jr. |
| 6,186,831 B1 | 2/2001 | Tsai |
| 6,328,604 B1 | 12/2001 | Inoue et al. |
| 6,361,384 B1 | 3/2002 | Manor et al. |
| 6,391,489 B1 | 5/2002 | Winch et al. |
| 6,626,702 B2 * | 9/2003 | Kurimoto et al. ........... 439/595 |
| 6,749,358 B2 | 6/2004 | Balsells |
| 6,755,694 B2 | 6/2004 | Ries et al. |
| 6,817,893 B2 * | 11/2004 | Schmid et al. ............. 439/522 |
| 6,835,084 B2 | 12/2004 | Poon et al. |
| 7,074,096 B2 | 7/2006 | Copper et al. |
| 2002/0115337 A1 | 8/2002 | Yamada |
| 2002/0123251 A1 | 9/2002 | Yatskov et al. |
| 2002/0123271 A1 | 9/2002 | Henry et al. |
| 2002/0187686 A1 * | 12/2002 | Zhao et al. ................ 439/843 |
| 2003/0124889 A1 | 7/2003 | Yamaguchi et al. |
| 2003/0124917 A1 * | 7/2003 | Aoyama .................... 439/860 |
| 2004/0002234 A1 | 1/2004 | Masao et al. |
| 2005/0250386 A1 * | 11/2005 | Kim .......................... 439/627 |

* cited by examiner

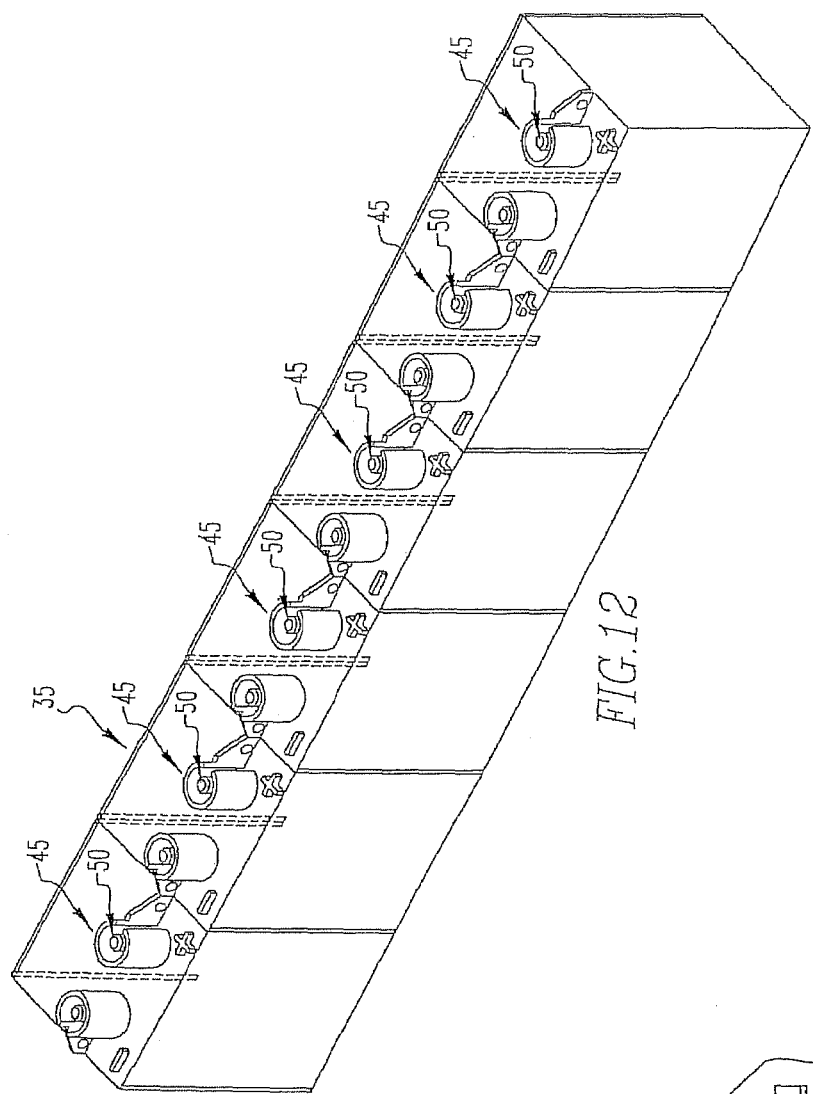
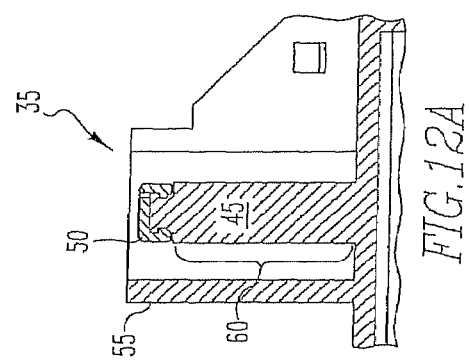

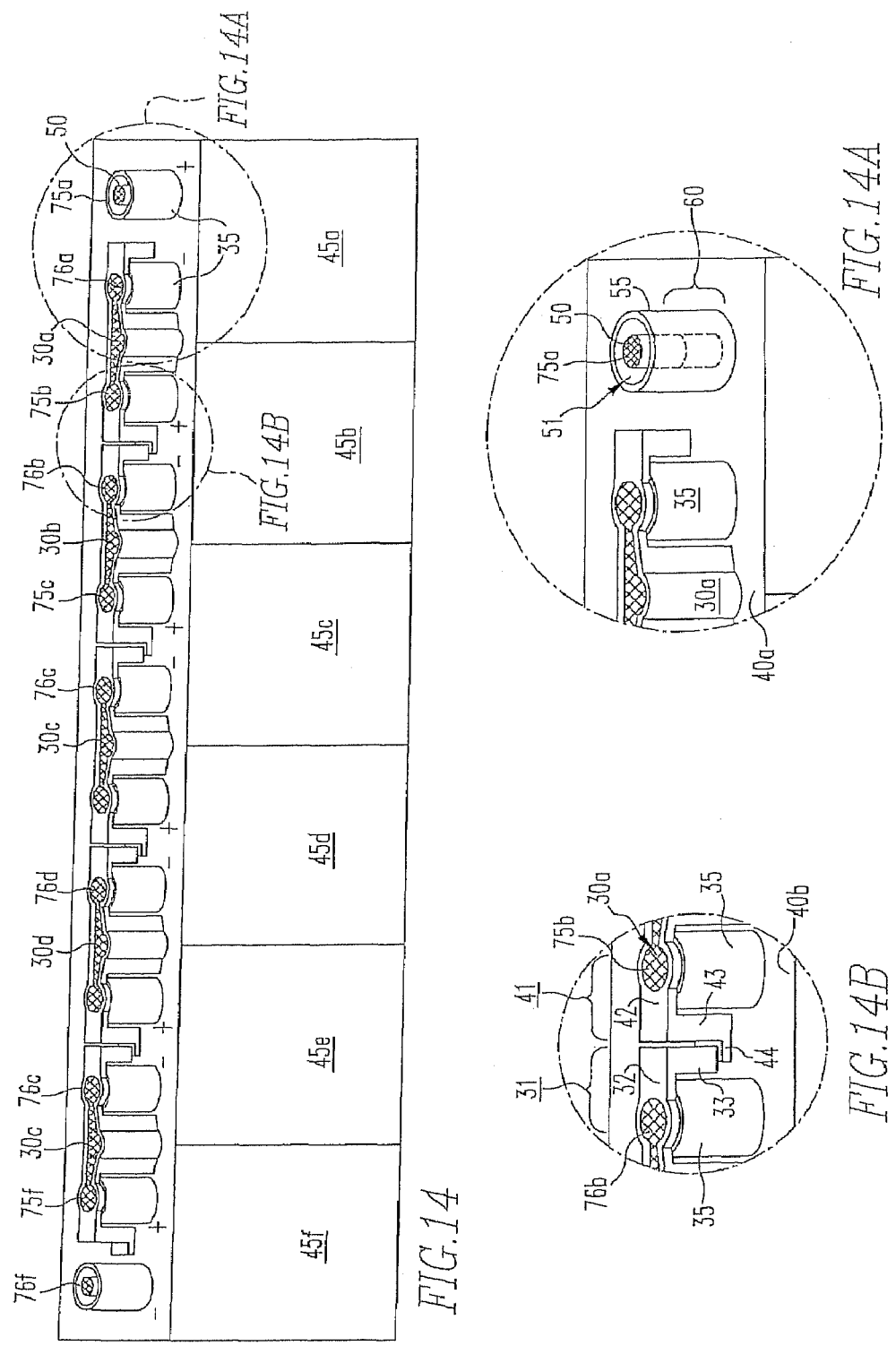

CANTED COIL SPRING POWER TERMINAL AND SEQUENCE CONNECTION SYSTEM

CROSS-REFERENCE TO RELATED APPLICATIONS

This application is a divisional application of application Ser. No. 11/137,289, filed on May 25, 2005 now U.S. Pat. No. 7,229,327.

FIELD OF THE INVENTION

The present invention relates to high current electrical connections, in which electrical communication between male and female terminals is provided by a canted coil spring interface. The present invention further relates to high voltage battery modules comprising a series of connectors having a structure that dictates an assembly sequence that substantially eliminates the incidence of high voltage electrocution.

BACKGROUND OF THE INVENTION

Male and female terminals in high current electrical connection systems are currently locked by terminals incorporating exterior plastic interlocking structures. The incorporation of the additional plastic interlocking structures to the exterior of the terminals disadvantageously increases the overall dimensions of the connectors. The increased dimensions of connectors having additional interlocking structures presents a number of design challenges for integration of the connectors into higher current electronics requiring increased electrical connector density.

One improvement to electrical terminals having interior interlocking structures are terminals including a canted coil spring, wherein the canted coil spring is positioned into a groove machined within the body of the female terminals. Prior canted coil spring terminals require that the groove be machined within each side of the female terminal body and that the coil spring be inserted into the machined groove in the female terminal body. The cost of the machining in producing each of the prior canted coil spring terminals is high.

Hybrid Electrical Vehicle (HEV) battery packs consist of number of battery modules, wherein each battery module has a plurality of battery cells. Typically, the battery modules are in electrical communication through module to module series connections and the battery cells are in electrical communication through cell to cell series connections. Currently, existing cell to cell connections use a welding process and module to module connections use nut-bolt fastening methods. These processes cause a variety of manufacturing obstacles and safety concerns.

Welding cell to cell connections presents a number of obstacles in manufacturing and servicing. Welding introduces elevated temperatures to the battery cell, which can damage the battery cell. In certain battery types, such as Lithium Ion batteries, the elevated temperatures associated with welding may be the source of an explosion. Further, when utilized in hybrid electrical vehicle applications, welded cell to cell battery packs are not economical to replace, since welded cells are not serviceable during manufacturing or during consumer maintenance.

Module to module connections require nut and bolt arrangements that also provide a number of difficulties, since this manufacturing method is prone to over-torquing or under-torquing of the nut and bolt fasteners. Additionally, cross threading of the bolts is also common, which may destroy the positive or negative battery post when over-torqued. The concise assembly required for high voltage battery module manufacturing and the need for closely monitored torque control render bolt and nut arrangements uneconomical for high voltage battery module manufacturing.

Further, methods for manufacturing high voltage battery modules present a number of dangers to those handling the high voltage battery modules during and after the manufacturing process. Although, each module usually has less than a 50 volt capacity, battery modules are currently being connected in series in order to meet the increasing demands of high-voltage applications, in which voltage levels on the order of about 100 volts to greater than 600 volts are presenting a number of challenges for ensuring safety during the manufacture of these high voltage connections using typical manufacturing methods.

In light of the above, what is needed is an electrical connector system for high current and high voltage applications that can be manufactured in an economical and safe fashion. Further, a need exists for a maintenance serviceable battery pack in which electrical connectors may be reliably and safely manufactured.

SUMMARY OF THE INVENTION

These needs, and others, are met by the present invention which provides an electrical terminal system suitable for high current applications, wherein the electrical terminal system includes a female terminal body having a stamped groove for accepting a canted coil spring and an opening having a geometry configured for accepting the inserting portion of a male terminal body. Electrical communication between the male and female terminal bodies is provided by an interface between the canted coil spring and the inserting portion of the male terminal body. Broadly, the inventive electrical terminal system comprises:

a male terminal body comprising an inserting portion;

a female terminal body having at least one open end for receiving said inserting portion of said male terminal body, said female terminal body comprising a stamped groove positioned corresponding to said inserted portion of said male terminal body when said female terminal body and said male terminal body are engaged; and a canted coil spring for providing an electrical interface between said male terminal body and said female terminal body, said canted coil spring positioned in said stamped groove.

The canted coil spring incorporated into the female terminal body is curvilinear in shape, wherein the opposing ends of the canted coil spring are mechanically connected or welded. The female terminal body is formed from a stamped sheet in which the stamped groove of the female terminal body is positioned in a portion of the stamped sheet metal that is folded during forming of the female terminal body into a geometry for accepting the inserting portion of the male terminal body.

The inserting portion of the male terminal body comprises a rounded pin having at least one groove for reversibly interlocking with the canted coil spring within the female terminal body. During engagement of the male and female terminal bodies, the inserting portion of the male terminal body is in communicative contact with the canted coil spring providing an electrical interface between the male and female terminal bodies.

Another aspect of the present invention is a method for manufacturing the above-described electrical terminal that incorporates a canted coil spring within a stamped groove of a female terminal body. Broadly, the inventive method comprises the steps of:

providing a stamped metal panel comprising a stamped groove about an opening for inserting a male terminal;

inserting a canted coil spring into said stamped groove; and folding a portion of said metal panel to contain said canted coil spring within said groove.

Another aspect of the present invention is an electrical power system that may incorporate the above described stamped female terminal body. Broadly, the inventive electrical power system comprises:

a plurality of battery modules in series connection between adjacent battery modules, wherein each battery module of said plurality of battery modules comprises a positive male terminal, a negative male terminal, and a socket corresponding to each of said positive male terminal and said negative male terminal; and a plurality of connectors, in which each terminal of said plurality of said connectors is in engagement with said socket of said positive male terminal and said negative male terminal of said adjacent battery modules, said each connector comprises an insulating structure housing a female terminal, said female terminal providing said series connection between said positive male terminal and said negative male terminal of said adjacent battery modules, said insulating structure comprising a sequence tab configured to provide an irreversible engagement sequence of said plurality of connectors within said sockets of said adjacent battery modules, wherein said irreversible engagement sequence positions said insulating structure atop said positive male terminal of said plurality of battery modules in series connection.

In the above described electrical power system, the irreversible engagement sequence ensures that the positive male terminal between adjacent battery modules in series engagement is not exposed. The incorporation of the sequence tab in combination with an insulative cap positioned atop the first positive male terminal of the first battery module in the assembling sequence substantially eliminates the possibility of high voltage electrocution during assembling and servicing of battery modules that are in series connection.

The insulative cap is positioned on the upper most portion of the inserting portion of the first positive male terminal leaving an exposed portion first positive male terminal extending below the insulative cap, in which the exposed portion is surrounded by an insulating shroud. The combination of the insulating cap and the insulating shroud in the correct dimensions provides increased safety by substantially eliminating incidental contact to the exposed portion of the positive male terminals. The term "incidental contact" denotes that the dimensions of the insulating cap and the insulating shroud ensure that a person handling the battery modules can not contact the exposed portion of the positive male terminal.

In another embodiment of the present invention, as opposed to only the first positive male terminal of the first battery module in the assembling sequence having an insulative cap and shroud, each of the positive male terminals on each battery module comprises an insulative cap and insulating shroud.

BRIEF DESCRIPTION OF THE DRAWINGS

A full understanding of the invention can be gained from the following description of the preferred embodiments when read in conjunction with the accompanying drawings in which:

FIG. 2b (cross-section view) illustrates one embodiment of a female terminal body having a canted coil spring positioned within a stamped groove depicted in FIG. 2a.

FIG. 3b (cross-section view) illustrates the cross-section of the terminal body depicted in FIG. 3a.

FIG. 12 (isometric view) depicts a plurality of battery modules in series connection in which each positive male terminal comprises an insulative cap, similar to that depicted in FIGS. 11a and 11b, atop its' uppermost surface.

FIG. 12a (cross-sectional view) illustrates a partial side cross-section view of the battery modules depicted in FIG. 12.

FIG. 12b (isometric view) depicts connectors engaged within the sockets of a plurality of battery modules in series connection, wherein each of the sockets houses a positive male terminal capped by an insulative cap, as depicted in FIG. 12a.

FIG. 14 (isometric view) depicts a plurality of battery modules in series connection through a number of connectors, as depicted in FIGS. 7a-7c, wherein only the first positive male terminal has an insulating cap and the connectors are installed in an assembling sequence that is dictated by a sequence tab which ensures that each positive male terminal of the battery modules that are in series connection are protected by the insulative structure of the connector.

FIG. 14a (isometric view) illustrates a magnified end portion of the battery modules depicted in FIG. 14, indicated by reference line 14a.

FIG. 14b (isometric view) illustrates a magnified view of the interface between adjacent connectors connecting the battery modules depicted in FIG. 14, indicated by reference line 14b.

DETAILED DESCRIPTION OF PREFERRED EMBODIMENTS

Figure 1:
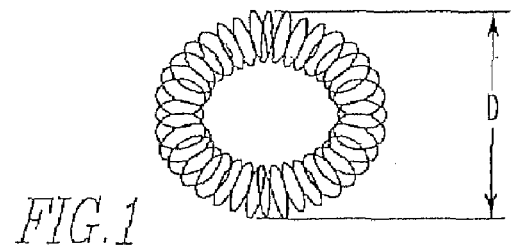
FIG. 1 (isometric view) illustrates a canted coil spring.

The present invention provides an electrical terminal system suitable for high current applications, wherein electrical communication between the inserting portion of a male terminal body and a female terminal body is provided by a canted coil spring positioned within a groove stamped into the female terminal body. The present invention also provides a means for manufacturing an electrical terminal system, in which a canted coil spring is positioned within a groove that is stamped into the female connector body. The present invention further provides an electrical connection system for cell to cell battery connections having increased reliability, safety and serviceability. The present invention also provides an electrical connection system for modular batteries having increased reliability, safety and serviceability. The present invention is now discussed in more detail referring to the drawings that accompany the present application. In the accompanying drawings, like and/or corresponding elements are referred to by like reference numbers.

FIG. 1 represents a canted coil spring 5 having a curvilinear shape, preferably being substantially circular. The curvilinear shape is provided by connecting the opposing ends of the coil spring 5. The opposing ends of the coil spring 5 may be welded or mechanically connected. Although the canted coil spring 5 typically comprises metal alloy any conductive material may be selected that is known within the art.

The present invention provides a female terminal body formed of stamped sheet metal, in which a groove is stamped within the female terminal body for accepting the canted coil spring 5 depicted in FIG. 1. The stamped sheet metal comprises a material selected from the group consisting of copper, aluminum, steel, and combinations and alloys thereof. In a preferred embodiment, the stamped sheet metal comprises copper alloy.

Figure 2A:
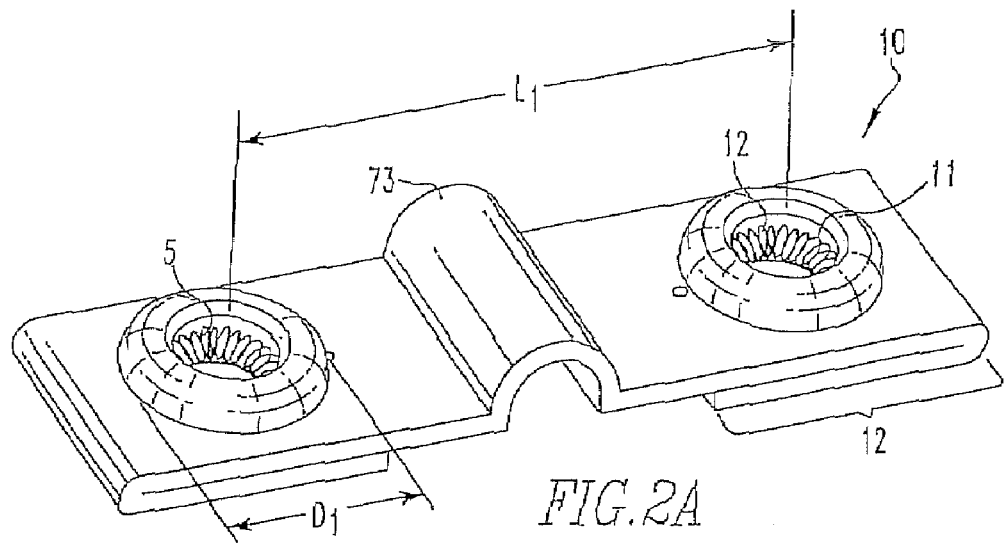
FIG. 2a (isometric view) illustrates one embodiment of a female terminal body having a canted coil spring positioned within a stamped groove.
Figure 2B:
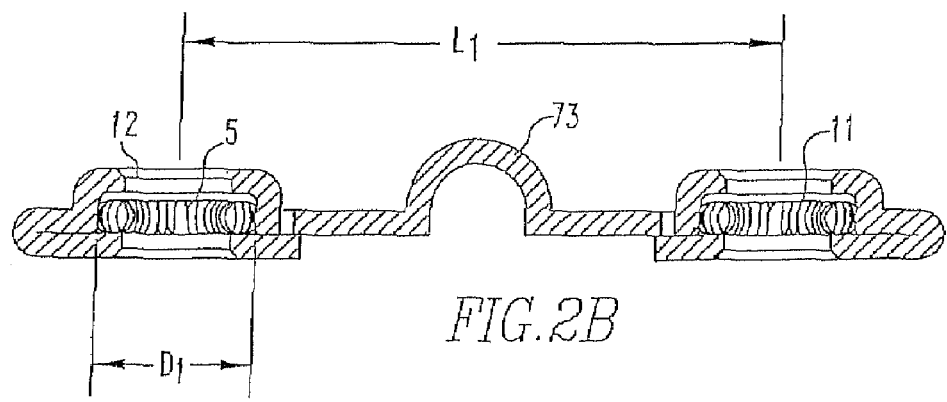

As shown in FIGS. 2a and 2b, in one embodiment of the female terminal body 10, the groove 11 for receiving the canted coil spring 5 may be positioned so that the dimension defining the diameter $D_1$ of the canted coil spring 5 is in a plane parallel to a dimension defining length $L_1$ of the female terminal body 10. In this embodiment the opening is disposed along a plane parallel to the length $L_1$ of the female terminal body 10. This embodiment of the present invention advantageously provides a female terminal body 10 having a substantially minimized profile.

Figure 2C:
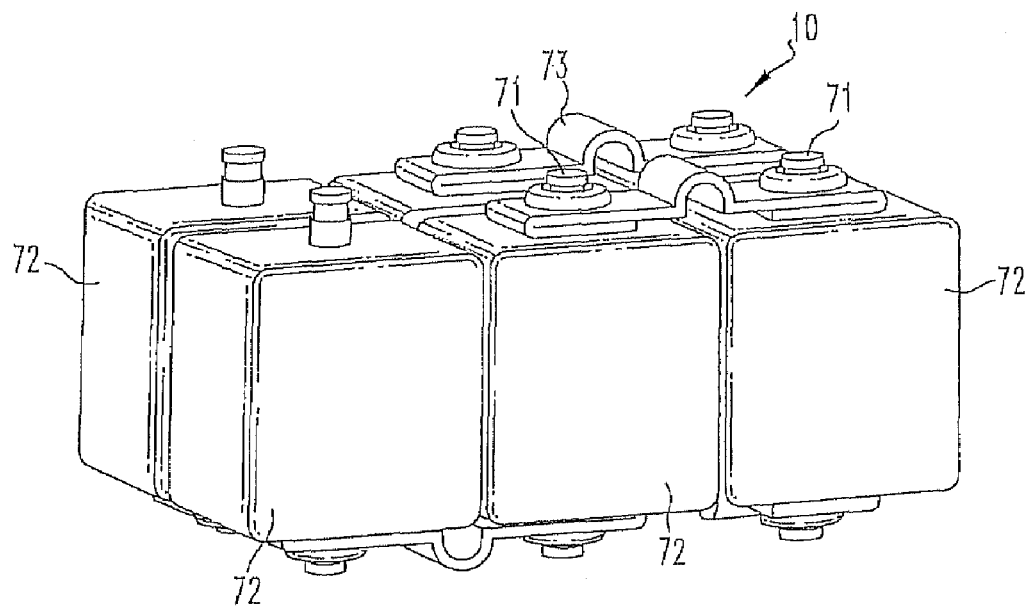
FIG. 2c (isometric view) depicts a series of battery cells, in which electrical communication by series connection is provided by the female terminal body depicted in FIGS. 2a and 2b.
Figure 2D:
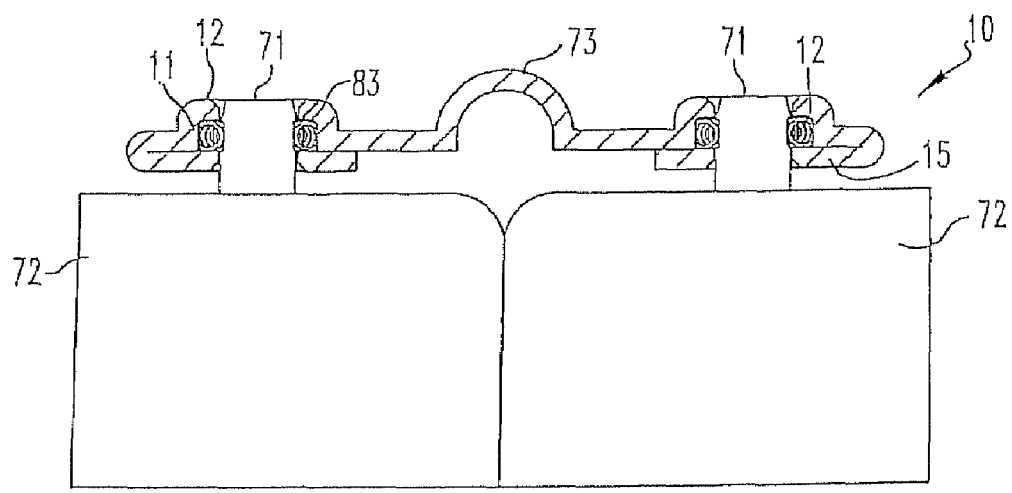
FIG. 2d (cross-section view) depicts the male terminal of two battery cells having a geometry for engaging a the female terminal body depicted in FIG. 2c.

In this embodiment of the present invention, the sheet metal is stamped to provide a preselected number of openings 12 configured for selective engagement to the inserting portion of the male terminal body 71, as depicted in FIGS. 2c and 2d. The groove 11 for containing the canted coil spring 5 is positioned about each opening 12. The positioning of the groove 11 is selected to ensure that the canted coil spring 5 provides electrical communication between the male terminal body 71 and the female terminal body 10.

Referring back to FIGS. 2a and 2b, the stamped sheet metal is further configured to provide a folding over portion 15, wherein the folding over portion 15 is folded over the portion of the stamped sheet metal in which the groove 11 is positioned to ensure that the canted coil spring 5 is contained therein. The canted coil spring 5 may be positioned within the groove 11 while the folding over portion 15 is bent into position. Although FIGS. 2a and 2b depict a female terminal body 10 having two openings 12, any number of openings 12 may be configured into the female terminal body 10 including only a single opening and are therefore within the scope of the present invention.

Referring to FIGS. 2c and 2d, the present invention also provides a female terminal body 10 having an interior canted coil spring 5 and groove 11 for engagement to a male post (terminal body) 71 positioned on a battery cell 72, in which each opening 12 is positioned to provide an electronic pathway to the battery cell 72. The canted coil spring 5 is interlocked within a grooved structure 83 on the male post 71, as shown in FIG. 2d. The engagement of the canted coil spring 5 within the grooved structure 83 of the male post 71 provides self interlocking female and male terminals. A flexible joint 73 between the openings 12, preferably in the form of a U-shape loop, can be stretched or compressed such that the distance L1 is adjusted accordingly. The adjustability of the distance L1 between the openings 12 of the female terminal 10 provides for greater tolerances in the distance variance between two the male posts 71 of the battery cells 72.

Figure 3A:
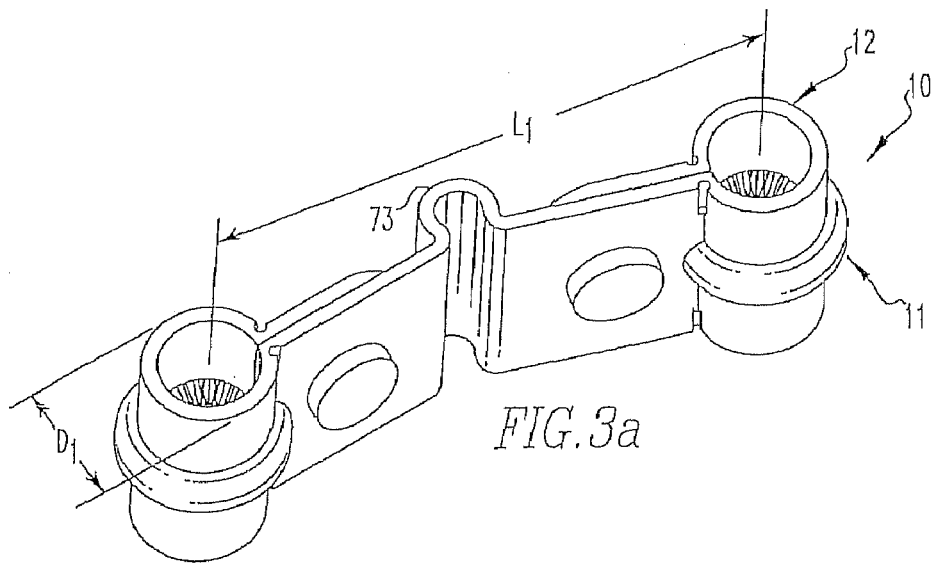
FIG. 3a (isometric view) illustrates another embodiment of a female terminal body having two openings for accepting the inserting portion of a male terminal, each opening of the female terminal body having a canted coil spring positioned within a stamped groove.
Figure 3B:
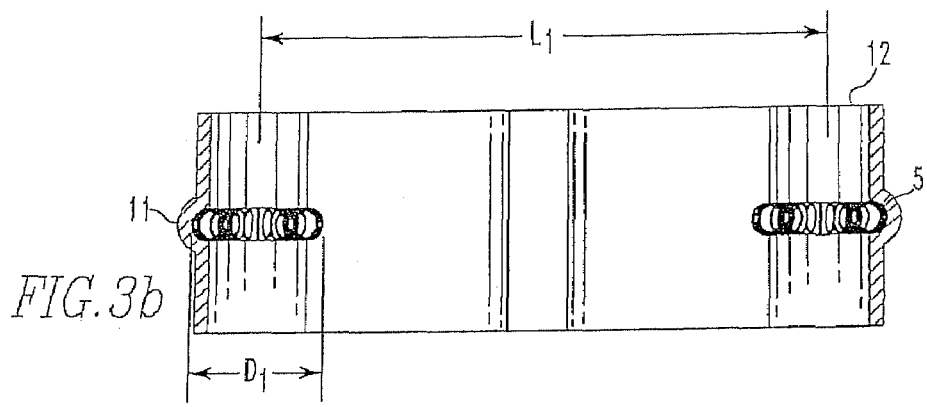
Figure 3C:
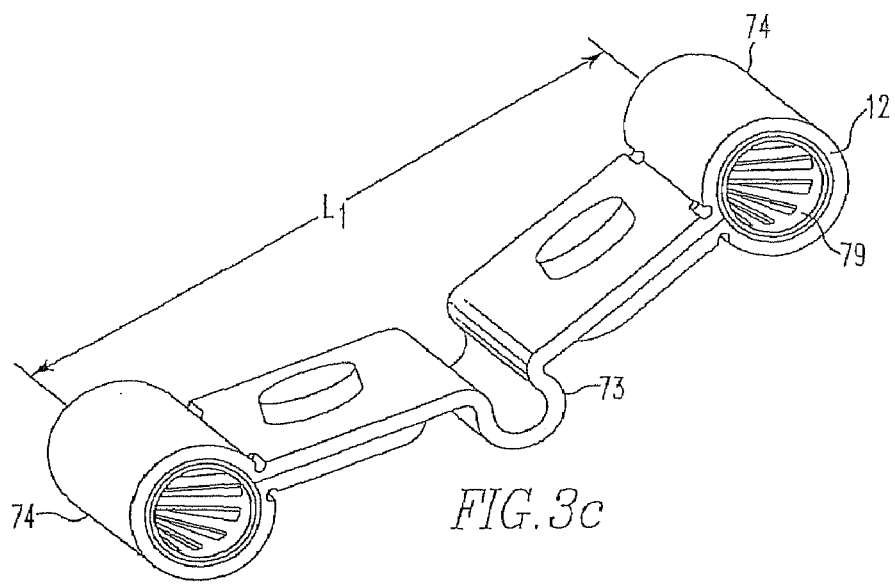
FIG. 3c (isometric view) depicts another embodiment of a female terminal body having two openings for accepting the inserting portion of a male terminal body, in which each opening of the female terminal body has a contact spring press fitted within a stamped sleeve.
Figure 8:
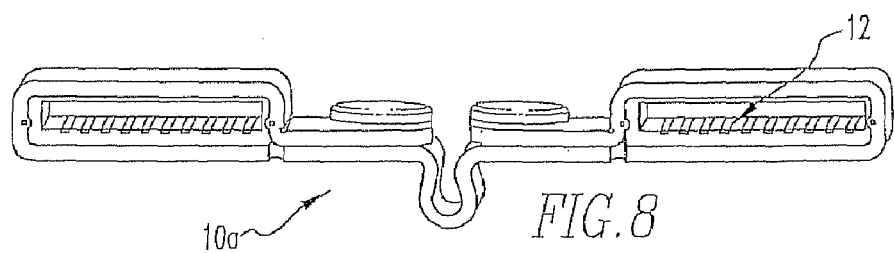
FIG. 8 (isometric view) depicts an alternative female terminal body having a polyhedron shaped opening configuration.

Referring now to FIGS. 3a-3c, in another embodiment of the present invention, the female terminal body 10 is formed from a stamped metal sheet in which each opening 12 of the female terminal body 10 comprises a rounded and cylindrical shape, as opposed to the flatter lower profile female terminal body 10 depicted in FIGS. 2a-2d. In this embodiment, the opening 12 in which the canted coil spring 5 is positioned is disposed along a plane perpendicular to the dimension defining length $L_1$ of the female terminal body 10. Although the female terminal body 10 may comprise any number of openings 12 for engagement with the male terminal body (not shown), including a single opening, in the embodiments of the present invention including multiple openings each opening 12 may be separated by an adjustable distance L1. Similar to the embodiments depicted in FIGS. 2a-2d, a U-shaped loop 73 may be incorporated into the embodiment depicted in FIGS. 3a-3c and can be stretched or compressed such that the distance L1 between the openings 12 may be adjusted, wherein the adjustable distance L1 provides greater tolerance in the distance variation between any two modules 40a, 40b that are in series connection, as depicted in FIG. 8.

Referring to FIG. 3c, in one embodiment of the present invention, the female terminal body 74 is formed from a stamped metal sheet in which each opening 12 of the female terminal body 74 comprises a rounded and cylindrical shape and a contact spring which is press fitted within the cylindrical sleeve. Although, the female terminal body 10 in FIGS.

3a-3c preferably contains a canted coil spring positioned within a stamped groove 11, alternatively a hourglass contact spring 79 may be pressed into female terminal body 74 shown in FIG. 3c.

Figure 4:
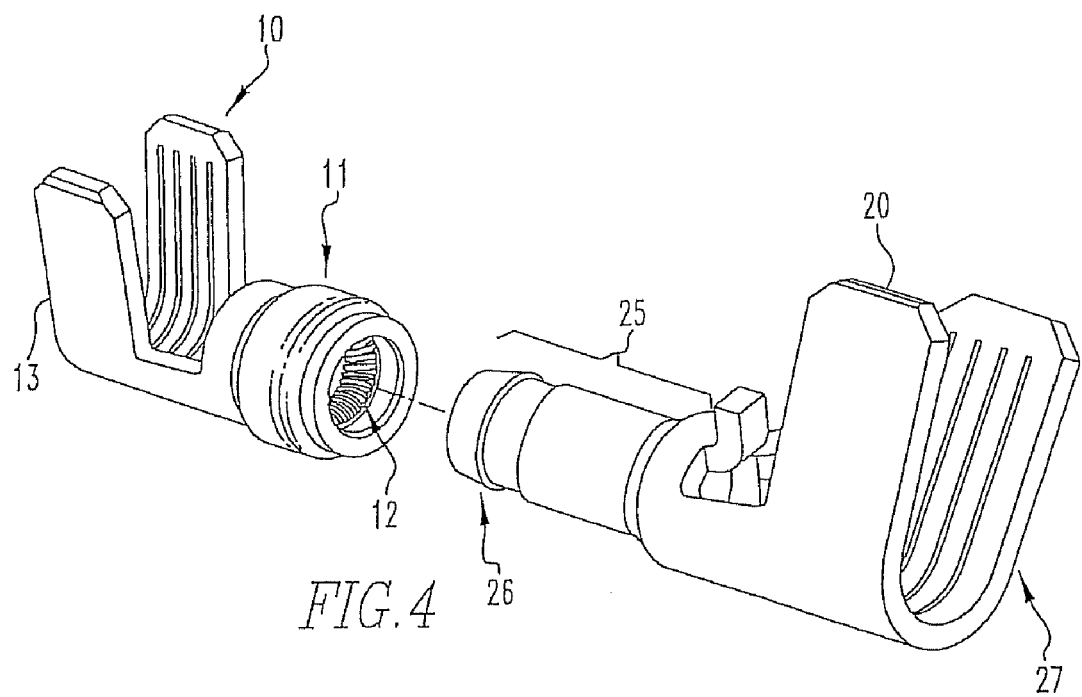
FIG. 4 (isometric view) illustrates a single female terminal similar in orientation to the female terminal bodies depicted in FIG. 3 and a male terminal body having a geometry corresponding to the opening of the female terminal body.

Referring now to FIG. 4, depicting a male terminal body 20 and female terminal body 10, the male terminal body 20 comprises an inserting portion 25 having a geometry for engagement into the opening 12 of the female terminal body 10. In one embodiment of the present invention, the inserting portion 25 of the male terminal body 20 comprises a rounded pin comprising at least one groove 26. In this embodiment, at least one of the grooves 26 in the male inserting portion 25 is adapted to reversibly interlock with the canted coil spring 5 contained within the stamped groove 12 of the female terminal body 10 when the male and female terminal bodies 20, 10 are engaged.

Still referring to FIG. 4, the male terminal body 20 may further include a male crimp end 27 for communicative engagement to at least one wire (not shown) opposite the inserting portion 25 of the male terminal body 20. Additionally, the female terminal body 10 may include a female crimp end 13 opposite the open end 12 of the female terminal body 10 for communicative engagement to at least one other wire (not shown) than the wires connected to the male crimp end 27.

Figure 5:
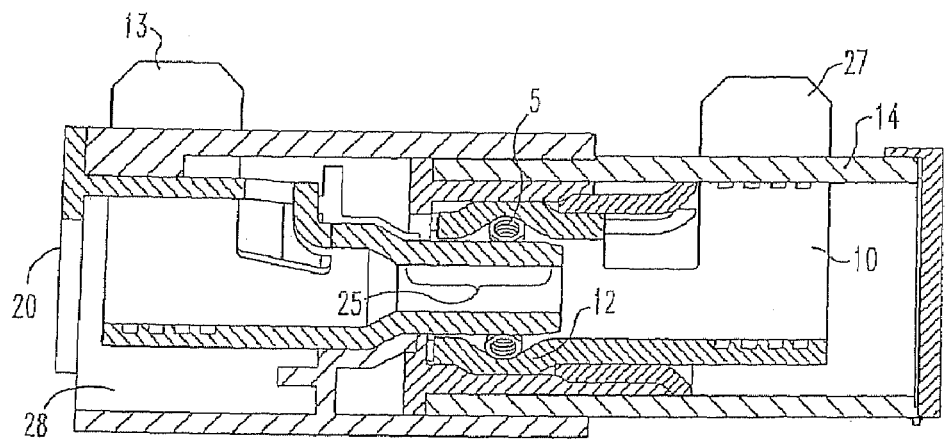
FIG. 5 (side view) depicts the female terminal body and the male terminal body of FIG. 4 each positioned within an unsealed housing.
Figure 6:
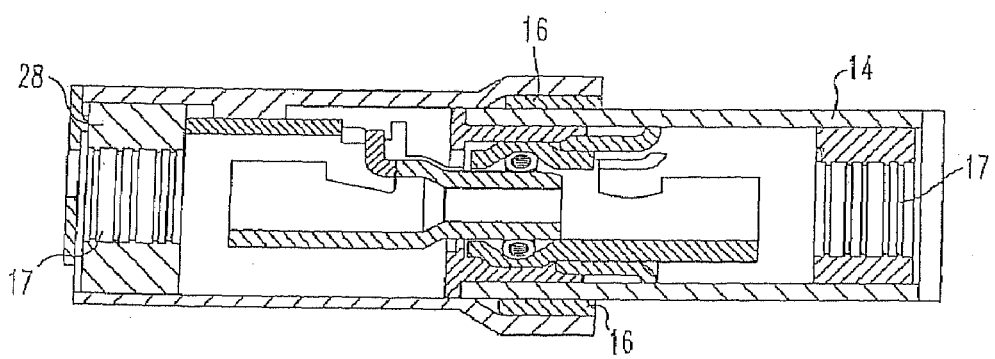
FIG. 6 (side view) depicts a female terminal body engaged with a male terminal body, wherein the female and male terminal bodies are positioned within a housing adapted to provide a sealing engagement.

Referring to FIG. 5, each of the male and female terminal bodies 10, 20 may be encased in a housing, wherein the housing may be adapted to provide a sealed engagement between the male and female terminal bodies 20, 10 or an unsealed engagement between the male and female terminal bodies 20, 10. A sealed engagement may be provided by a female polymeric structure 14 shown in FIGS. 5 and 6 housing the female electrical terminal 10 and a male polymeric structure 28 housing the male electrical terminal 20, wherein engaging portions of the female polymeric structure 14 and the male polymeric structure 28 may provide an interfacial seal when the male terminal body 20 and the female terminal body 10 are engaged. In another embodiment of the present invention, the interfacial seal between the female polymeric structure 14 and the male polymeric structure 28 is provided by a sealing gasket 16 at an interface defined by the joining portions of the male and female polymeric structures 28, 14, as shown in FIG. 6. The sealing gasket 16 may comprise any sealing material including a polymeric material.

Additionally, further sealing members 17 may be provided at the wire connecting portions of the male and female polymeric structures 28, 14, wherein the wire connecting portions are opposite the inserting portion 25 of the male terminal body 20 and the open end 12 of the female terminal body 10. The sealing members 17 may be formed from any material that may be adapted to provide a hermiadic seal.

Figure 7A:
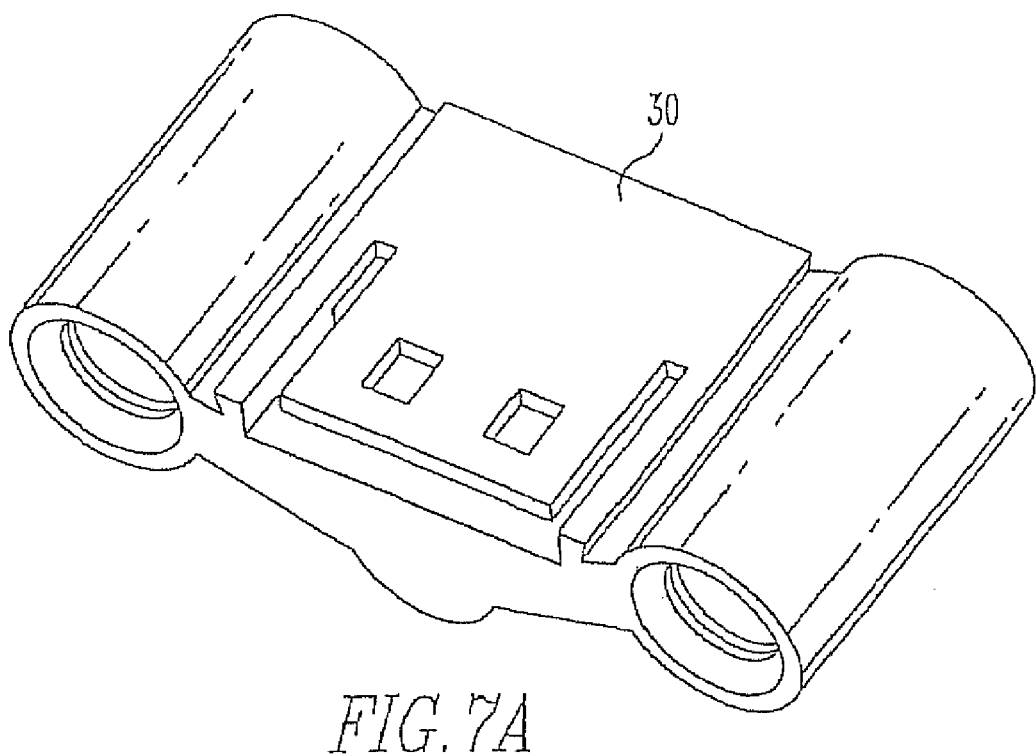
FIGS. 7a-7c (isometric view) depict connectors having a geometry corresponding to the female terminal body depicted in FIGS. 3a-3c.
Figure 7B:
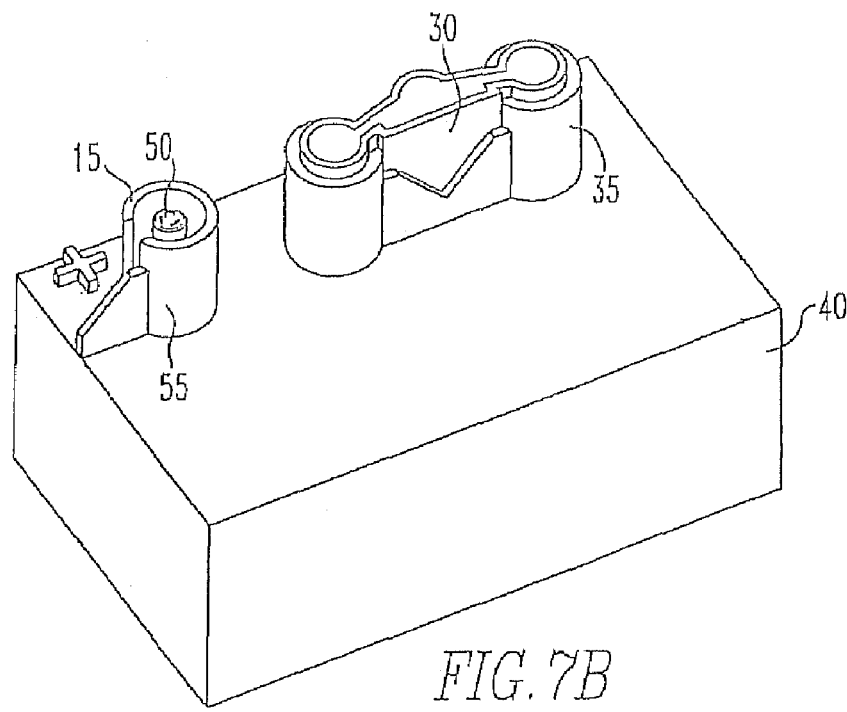
Figure 7C:
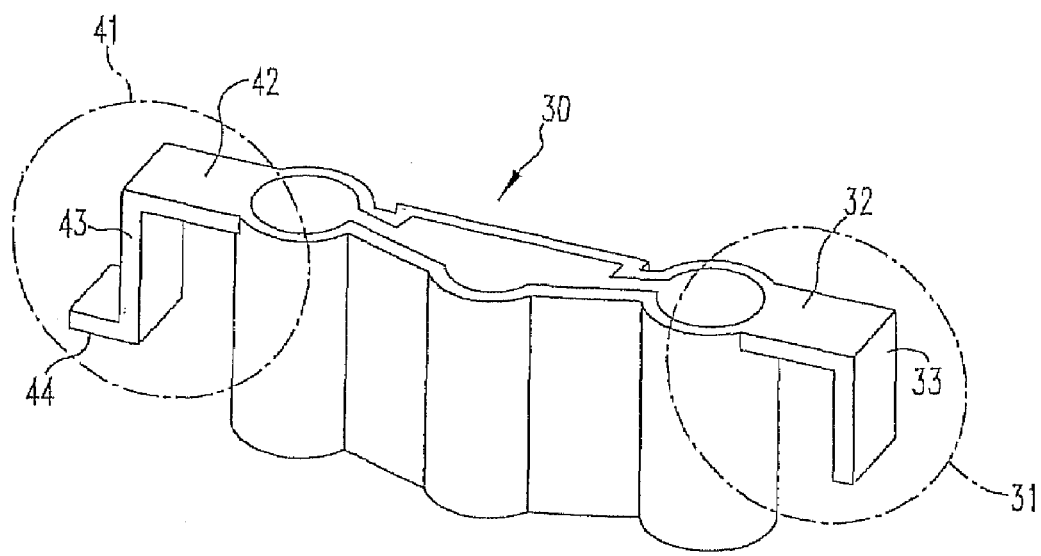
Figure 12B:
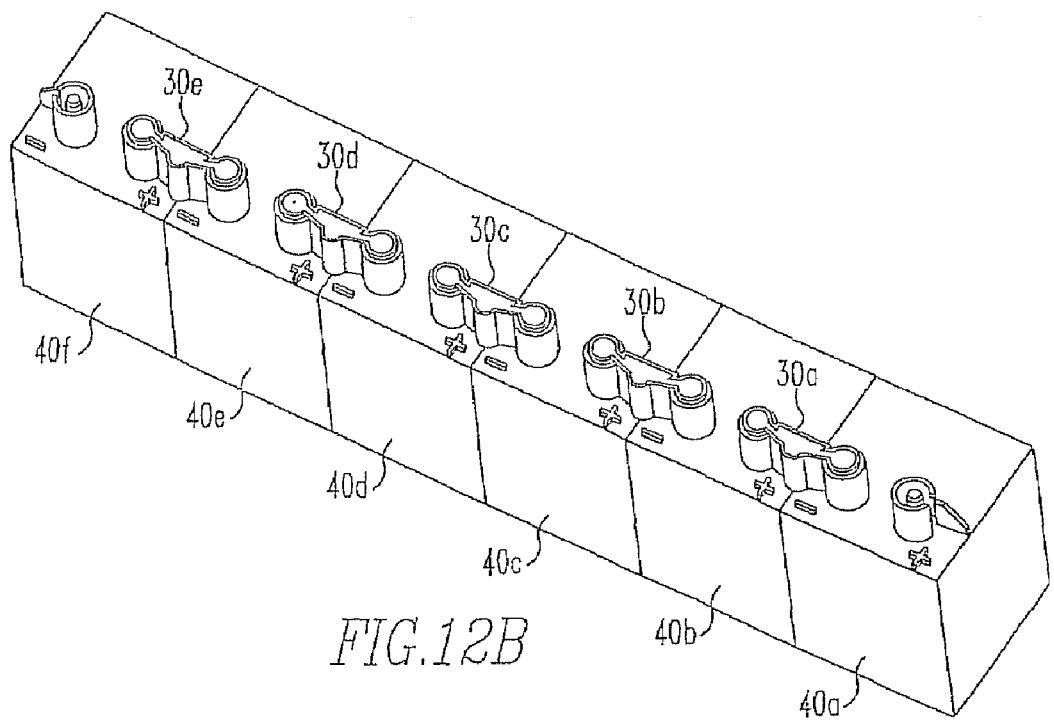

Referring to FIGS. 7a, 7b, 7c, the present invention also provides a connector 30 having an interior geometry for accepting a stamped female terminal body 10, as depicted in FIG. 3a-3c, and an exterior geometry for engagement to a socket 35 positioned on the housing of a modular battery 40, in which each socket 35 is positioned to provide an electronic pathway to the modular battery 40. The connector 30 typically comprises an insulative material housing (structure) such as a plastic material. In a preferred embodiment, a plurality of sockets 35 are positioned in an inline arrangement atop the modular battery 40, wherein the engagement of multiple connectors 30 into the inline arrangement of sockets 35 provides for a series connection between adjacent battery modules, as depicted in FIGS. 12b and 14.

Figure 9:
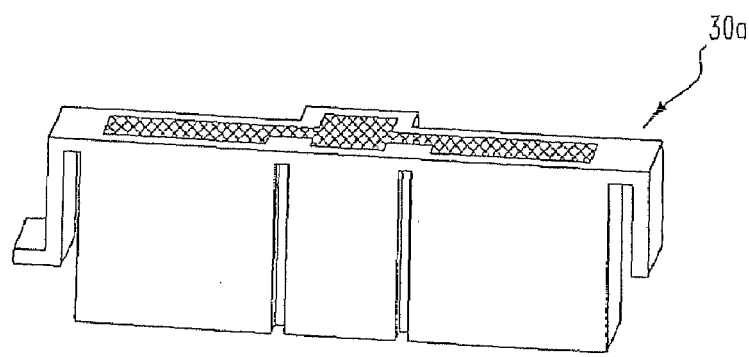
FIG. 9 (isometric view) depicts a connector having a geometry corresponding to the female terminal body depicted in FIG. 8.
Figure 10:
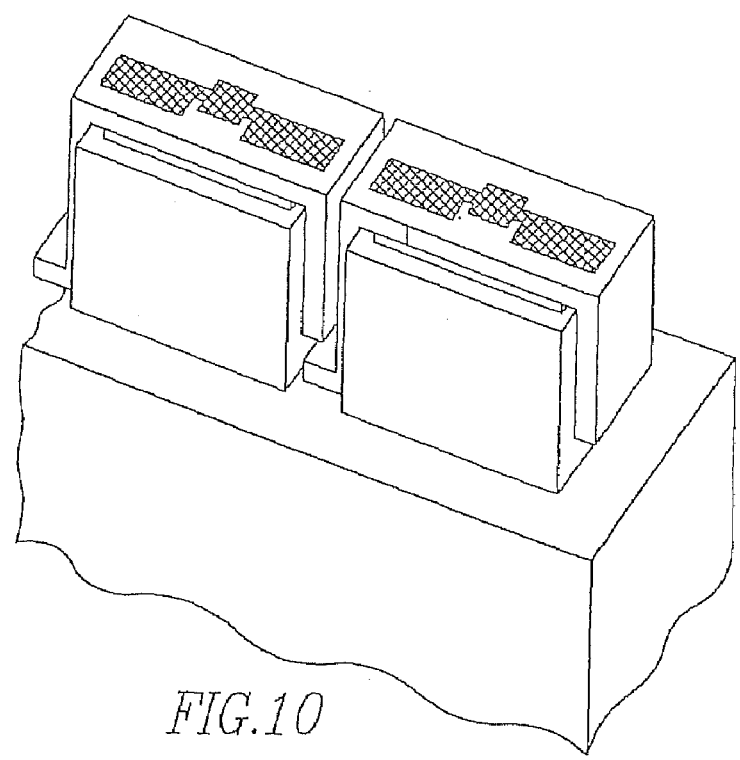
FIG. 10 (isometric view) depicts a plurality of battery modules in series connection through a number of connectors, as depicted in FIG. 9, wherein each connector houses a female terminal body, as depicted in FIG. 8.

Although the connectors 30 depicted in FIGS. 7a-7c have a geometry for accepting the stamped female terminal body 10 depicted in FIGS. 3a-3c, it is noted that other geometries for the connectors 30 have been contemplated and are within the scope of the present invention. For example, instead of the curvilinear shaped openings, the female terminal body 10a may have the at least two polyhedron shape openings 12a, as depicted in FIG. 8, and the connector 30a may have a configuration to accept the female terminal body 10a comprising polyhedron shaped openings 12a, as depicted in FIG. 9. As shown in FIG. 10, the battery module 40a may comprise a series of sockets 35a for interlockingly engaging the terminal housing 30a depicted in FIG. 9.

Regardless of the connector geometry employed, each connector 30, 30a houses a female terminal body 10 in which the upper portion of the connector 30, 30a serves as a insulative cap to isolate the female terminal body 10 contained within the connector from contact by those assembling or servicing the battery modules. The end opposing the insulative cap portion of the connector 30 provides an opening that allows for electrical contact between the female terminal body contained within the connector and the positive and negative male terminals of the battery modules when the connector is engaged within the battery module sockets. The connector 30 further provides a set of interlocking arms 31, 41, in which at least one of the interlocking arms 41 may comprise a sequence tab 44.

Referring now to FIGS. 11a, 11b, 12a, 12b, 13, 14, 14a and 14b, the present invention also provides a means for decreasing the incidence of electrical shocks to those handling high voltage battery modules 40. Typically, the module voltage is about 40-50 volts, but the voltage may reach approximately 100 volts to approximately 600 volts if a plurality of battery modules are connected together in series. During assembling or servicing of battery modules which are connected in series, the safety of the handlers becomes a concern when the positive male terminals of two or more battery modules are connected in a manner that allows for electrocution of the handlers by incidental contact to the positive male terminals.

Figure 11A:
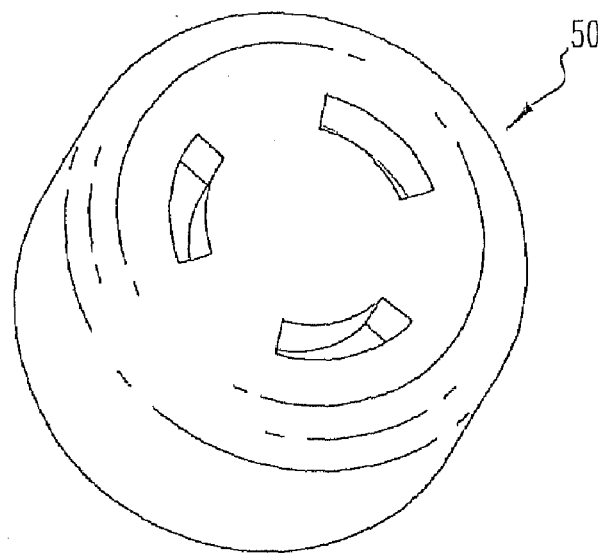
FIG. 11a (isometric view) and FIG. 11b depict an insulative cap that may be positioned atop an upper portion of the inserting portion of the male terminal body.
Figure 11B:
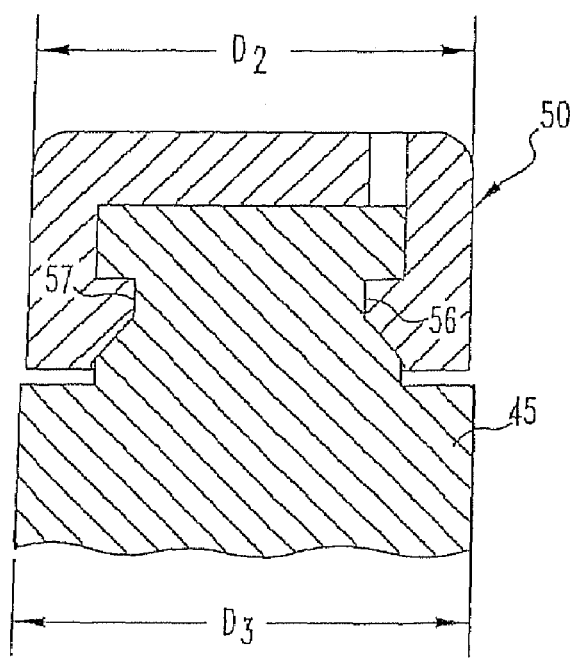

In one embodiment of the present invention, an insulating cap 50, as depicted in FIGS. 11a and 11b, is positioned atop the upper portion of each positive male terminal 45 (also referred to as the positive male post) in a plurality of battery modules, as depicted in FIG. 12a. Referring to FIG. 11b, the insulative cap 50 is snapped onto the upper portion of the positive male terminal 45 and has an exterior cap diameter $D_2$ slightly smaller than the male terminal diameter $D_3$, such that the female terminal can be easily engaged in electrical communication with the male terminal 45. In one embodiment of the present invention, the insulating cap 50 comprises an integrated snap ring 56, wherein the integrated snap ring 56 engages into a groove 57 in the upper portion of the positive male terminal 45 in order to secure the insulating cap 60 atop the positive male terminal 45.

Figure 13:
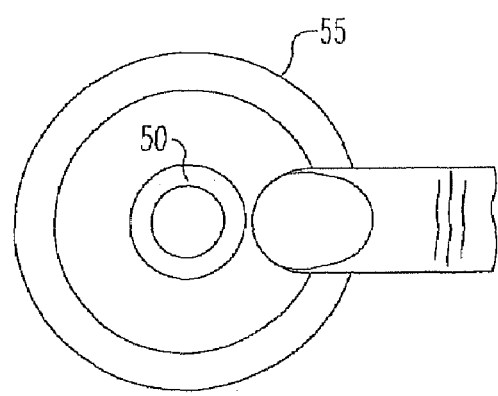
FIG. 13 (top view) depicts a positive male connector having the insulative cap depicted in FIG. 12, in which the dimensions of the cap and the insulating shroud surrounding the positive male connector protect the positive male connector from incidental contact.

Referring to FIGS. 12a and 13, in one embodiment of the present invention, the spacing $S_1$ between the insulating shroud 55 of the socket 35 and the insulating cap 50 ensure that those handling the series connected battery modules can not contact the exposed portion 60 of the positive male terminal 45 extending from below the insulating cap 50. In a preferred embodiment, the spacing between the insulating shroud 55 and the insulating cap 50 is limited to a 6 nm maximum in order to ensure that the handlers can not contact the live portions (exposed portion 60) of the positive male terminal 45 and hence can not be electrocuted. In this embodiment, adjacent battery modules including the capped positive terminals may be connected in series by connectors housing female terminals, in which the female terminals provide electrical communication between the positive and negative male terminals of adjacent battery modules. Specifically, as depicted in FIG. 12b, the female terminals contained within the connectors 30a, 30b, 30c, 30d and 30e allow for a plurality of battery modules 40a, 40b, 40c, 40d, 40e, 40f to be series connected using any assembly sequence, while providing a means to protect handlers from being electrocuted.

Referring now to FIGS. 14, 14a and 14b, in another embodiment of the present invention, instead of capping all of the positive male terminals with insulative caps, the incidence of electrocution during the assembly or maintenance of battery modules in series may be substantially reduced by capping only the first positive male terminal with an insulating cap and inserting the connectors in a sequence that ensures that each of the positive male terminals of the series connected battery modules are protected from incidental contact. In one embodiment of the present invention, a sequence tab extending from the insulating structure of the connector ensures that as each connector is engaged into the sockets of the series connected battery modules the positive male terminal is protected by the connectors insulating housing. The sequence tab ensures that each of the connectors is inserted in a sequential order that provides that the positive male terminal of each series connected battery module can not be reached or cause handlers of the series connected battery modules to be electrocuted. The sequence in which the connectors are engaged is now described in greater detail.

FIGS. 14, 14a and 14b depict a plurality of battery modules 40a, 40b, 40c, 40d, 40e, 40f, in series connection through a plurality of connectors 30a, 30b, 30c, 30d, 30e, in which each connector is engaged within a socket of adjacent battery modules providing electrical communication between the positive and negative battery modules. Each connector houses a female terminal (not shown) that provides electrical communication between the positive male terminal (also referred to as positive male post) and the negative male terminal (also referred to as negative male post) of adjacent battery terminals. Although the engagement of the connectors 30a, 30b, 30c, 30d, 30e within the adjacent battery module's sockets 35 obstructs the view of the underlying positive and negative male terminals, the positioning of the male terminals is illustrated in FIG. 14 by reference numbers 75a, 75b, 75c, 75d, 75e for the positive terminals, and reference numbers 76a, 76b, 76c, 76d, 76e for the negative terminals. In one instance, each connector 30a, 30b, 30c, 30d, 30e provides an insulative structure that houses a female terminal body, in which the female terminal body engages the negative male post of a first battery module and the positive male post of an adjacent battery module. The insulative structure houses the female terminal body, shielding the female terminal body from contact by handlers during assembly and servicing of the battery modules.

Referring to FIGS. 14, 14a, and 14b, in the embodiments of the present invention in which only the first positive male terminal 75a is capped by an insulating cap 50, the insulating structure of the connectors 30a, 30b, 30c, 30d, 30e further includes a sequence tab 44 that dictates the sequence in which the connectors 30a, 30b, 30c, 30d, 30e are engaged within the sockets 35 of adjacent battery modules in connecting a plurality of battery modules, e.g. 40a, 40b, 40c, 40d, 40e, 40f. In a preferred embodiment, the insulative structure of each of the connectors 30a further comprises at least two interlocking arms 31, 41, wherein one of the interlocking arms 41 includes the sequence tab 44.

Still referring to FIGS. 14, 14a, and 14b, the sequence tab 44 provides that as the first terminal 30a connects the first two battery modules 40a, 40b of the assembly sequence in a series that the positive male terminal 75b the second battery module 40b of the series connected battery modules 40a, 40b is protected from incidental contact by handlers. In this arrangement, although the positive male terminal 75b of the second battery module 75b is covered by the insulating structure of the housing, the negative male terminal 76b may be exposed. A second connector 30b of the assembly sequence is then engaged to connect the second and third battery modules 40b, 40c in series connection, wherein the insulative structure of the second connector 30b covers the negative male terminal 76b of the second battery module 40b, positive male terminal 75c of the third battery module 40c and leaves the negative male terminal 76c of the third battery module 40c exposed. Another third connector 30c of the sequence is then installed, and so on, until at the last battery module 40f, the last positive male terminal 75f is covered by the insulative structure of the last connector 30e in the assembly sequence and the last negative post 76f is left exposed.

As shown in FIGS. 14, 14a and 14b, each interlocking arm 31, 41 of each connector comprises an overlying portion 32, 42 that extends atop an upper surface of the socket 35 in which the connector 30a is engaged, and a vertical post 33, 43 extending downward from the overlying portion 32, 42 of each interlocking arm 41, 42. Each vertical post 33, 43 contacts the exterior of the socket's 35 sidewall. In one embodiment of the present invention, an irreversible interlocking engagement is provided by a sequence tab 44 extending from one of the interlocking arms 41, wherein the opposing interlocking arm 31 is not equipped with a sequence tab 44. More specifically, an irreversible interlocking engagement between a first connector 30a and an adjacent connector 30b is provided by direct contact between the sequence tab 44 that extends horizontally from the base portion of the vertical post 43 of the interlocking arm 41 of a first connector 30a and the vertical post 43 of the interlocking arm of an adjacently positioned connector 30b.

In this embodiment of the interlocking arms, the top surface of the horizontally extending tab 44 of a first terminal housing 30a is directly contacted by the vertical post 33 of the adjacent terminal housing 30b to ensure that each connector 30a, 30b is engaged in an irreversible assembly sequence. It is noted that in this arrangement, the horizontally extending tab 44 is positioned on every other vertical post 43, in which the vertical post 43 comprising the horizontally extending sequence tab 44 is positioned along the positive male terminal (post)(+) (on left side of the socket's 35 sidewall) so that each of the connectors 30a, 30b may be inserted into their respective sockets 35 from right to left and may be removed from their respective sockets 35 from left to right.

If the sequence in which the connectors are engaged into the sockets of the battery modules is alternated the battery modules cannot be connected. For example, if the battery modules 40b and 40c are first connected by connector 30b, the tab 44 of adjacent connector 30a will be stopped at the overlying portion 32 of the interlocking arm of the first connector 30, wherein the adjacent connector 30a will be obstructed from being engaged. Reversely, during service, the connector 30c must be removed first followed by connector 30b, and so on. In this fashion, no positive post which is in series connection is exposed during the assembly or service process. Therefore, high voltage (on the order of 100 volts to 600 volts) electrocution is avoided.

Although FIGS. 14, 14a, and 14b, depict the connectors illustrated in FIGS. 7a-7c and the female terminal bodies depicted in FIGS. 3a-3c, the above described assembly sequence and related structured are equally applicable to the female terminal bodies and connectors depicted in FIGS. 8-10.

Figure 15A:
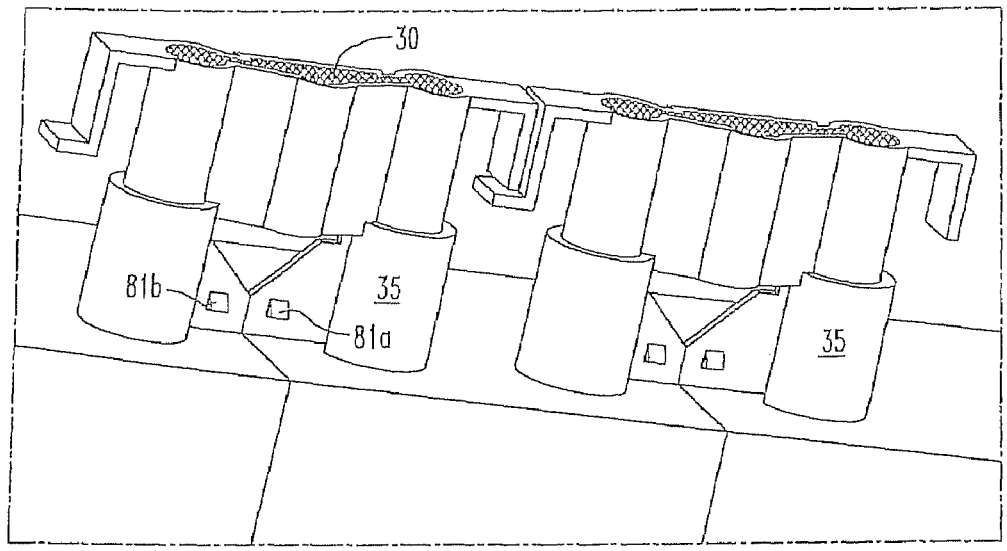
FIG. 15a-15c (isometric view) depicts the locking engagement between the connector and the socket in winch the connector is inserted.
Figure 15B:
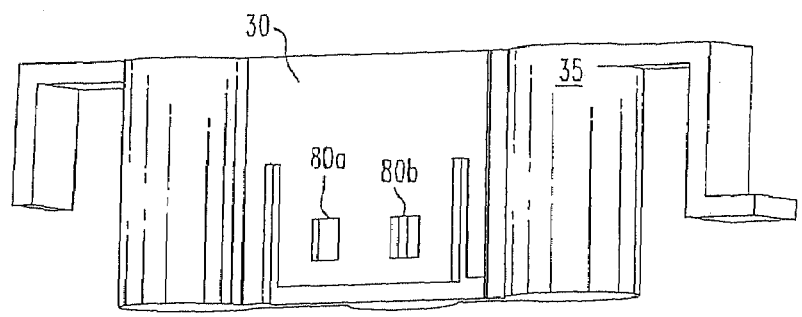
Figure 15C:
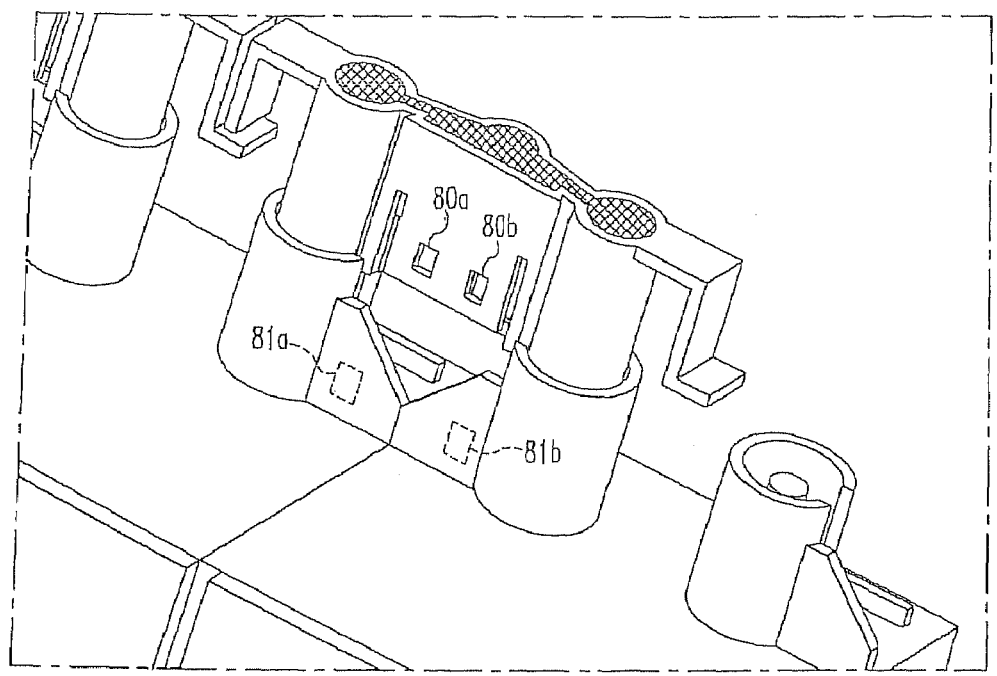

Referring now to FIGS. 15a, 15b, and 15c, in another embodiment of the present invention, a locking arrangement between the sockets and the connector engaged therein is provided by a series of interlocking protrusions 81a, 81b and windows 80a, 80b. More specifically, in embodiments of the present invention in which the terminal housing 30 has locking windows 80a and 80b, the male connector socket has locking protrusions 81a on one module and 81b on an adjacent module. When terminal housing 30 is fully engaged within with battery module socket 35, the protrusion 81a and 81b are dropped into locking window 80a and 80b, respectively. Therefore, the terminal housing is locked within the socket 35 and provides two adjacent modules.

The locking arrangement guarantees the orientation of interlocking arms such that sequence connection must be followed and the connection sequence is irreversible. Further, the locking arrangement guarantees that the disconnection sequence must be followed in reverse of the connection sequence.

While the present invention has been particularly shown and described with respect to the preferred embodiments thereof, it will be understood by those skilled in the art that the foregoing and other changes in forms of details may be made without departing form the spirit and scope of the present invention. It is therefore intended that the present invention not be limited to the exact forms and details described and illustrated, but fall within the scope of the appended claims.

What is claimed is:

1. In an electrical terminal having a female body including an opening, a spring, and a groove communicating with said opening for housing said spring internally of said opening, the improvement wherein said groove is formed by a stamping process performed on said female body, wherein said female body includes a sheet of stamped metal having a first portion containing one side of said opening and a second portion folded over so as to be in contact with said first portion, said second portion containing an opposite side of said opening and cooperating with said first portion to form said groove, and wherein a dimension defining said diameter of said spring is perpendicular to a dimension defining a length of said female body.

2. The electrical terminal of claim 1, wherein said spring is curvilinear in shape.

3. The electrical terminal of claim 1, wherein said spring reversibly interlocks with a groove formed on a male terminal body.

4. The electrical terminal of claim 1, wherein the dimension defining the diameter of said spring is parallel to the dimension defining the length of said female body.

5. The electrical terminal of claim 1, wherein said opening of said female body is substantially cylindrical.

6. The electrical terminal of claim 1, wherein said female body includes another opening, said openings being separated by a distance.

7. The electrical terminal of claim 6, wherein said distance is adjustable.

8. The electrical terminal of claim 7, further comprising a flexible U-shaped loop disposed between said openings, whereby said distance may be adjusted by manipulating said loop.

9. The electrical terminal of claim 1, further comprising a connector housing which is movable from a sealed configuration to an unsealed configuration, said female body engaging a male terminal body in said connector housing.

10. The electrical terminal of claim 1, wherein said groove includes a cylindrical sleeve, said spring being press fitted into said sleeve.

11. The electrical terminal of claim 1, wherein said opening is sized and shaped so as to receive a male terminal body.

12. The electrical terminal of claim 1, wherein said spring is a canted coil spring.

13. The electrical terminal of claim 1, wherein said opening is substantially polyhedron shaped.

14. An electrical terminal, comprising:
a female body including a sheet of stamped metal having a first portion containing one end of a first opening, a second portion containing an opposite end of said first opening, a third portion containing one end of a second opening and a fourth portion containing an opposite end of said second opening, said second portion being folded over so as to be in contact with said first portion such that said ends of said first opening are aligned, and said fourth portion being folded over so as to be in contact with said third portion such that said ends of said second opening are aligned;
first and second grooves formed in said first and second openings, respectively;
a first spring disposed in said first groove;
a second spring disposed in said second groove; and
a flexible loop disposed between said openings, said openings being separated by a distance, whereby said distance may be adjusted by manipulating said loop.

15. The electrical terminal of claim 14, wherein said first and second grooves are formed by a stamping process performed on said female body.

* * * * *